(12) United States Patent
Peters

(10) Patent No.: US 11,054,901 B2
(45) Date of Patent: Jul. 6, 2021

(54) VIRTUAL REALITY INTERACTION MONITORING

(71) Applicant: Dream Channel Pty. Ltd., Mosman (AU)

(72) Inventor: Jonathan Peters, Mosman (AU)

(73) Assignee: Dream Channel Pty. Ltd., Mosman (AU)

( * ) Notice: Subject to any disclaimer, the term of this patent is extended or adjusted under 35 U.S.C. 154(b) by 0 days.

(21) Appl. No.: 16/641,557

(22) PCT Filed: Aug. 29, 2018

(86) PCT No.: PCT/AU2018/050923
§ 371 (c)(1),
(2) Date: Feb. 24, 2020

(87) PCT Pub. No.: WO2019/036773
PCT Pub. Date: Feb. 28, 2019

(65) Prior Publication Data
US 2020/0174563 A1 Jun. 4, 2020

(30) Foreign Application Priority Data

Aug. 24, 2017 (AU) ................................ 2017903418

(51) Int. Cl.
*G06F 3/01* (2006.01)
*G06Q 20/06* (2012.01)
(Continued)

(52) U.S. Cl.
CPC .............. *G06F 3/013* (2013.01); *G06F 3/012* (2013.01); *G06F 16/2379* (2019.01);
(Continued)

(58) Field of Classification Search
CPC .............. A63F 13/61; A63F 2300/5506; A63F 2300/8082; G06F 16/2379; G06F 3/011;
(Continued)

(56) References Cited

U.S. PATENT DOCUMENTS

2014/0201057 A1* 7/2014 Shuster .................. G06Q 40/04
705/37
2016/0026242 A1 1/2016 Burns et al.
(Continued)

OTHER PUBLICATIONS

Meilich, A. et al., "Decentraland: Blockchain-powered virtual reality platform", published Jul. 31, 2017,[retrieved from Internet on Feb. 1, 2018], 6 pages <URL: https://medium.com/@cryptojudgement/decentraland-blockchain-powered-virtual-reality-platform-73a6a483b8b4>.
(Continued)

*Primary Examiner* — Afroza Chowdhury
(74) *Attorney, Agent, or Firm* — Seed Intellectual Property Law Group LLP

(57) ABSTRACT

A computer system that monitors interactions with a virtual reality environment includes a graphics processor that generates images representing the virtual reality environment, a headset that displays the generated images to a user interacting with the virtual reality environment, a sensor that detects motion of the user as the user interacts with the virtual reality environment, a gaze controller that calculates a gaze of the user based on the detected motion of the user and identifies objects in the virtual reality environment with which the user interacts based on the calculated gaze of the user, and an interaction monitor that quantifies interactions of the user with an identified object in the virtual reality environment based on transactions on a distributed ledger. The transactions comprise logic expressions that define an automatic execution triggered by the interaction of the user with the object in the virtual reality environment.

17 Claims, 7 Drawing Sheets

(51) Int. Cl.
  *G06Q 50/00*    (2012.01)
  *G06Q 20/22*    (2012.01)
  *G06F 16/21*    (2019.01)
  *G06F 16/23*    (2019.01)
  *A63F 13/61*    (2014.01)

(52) U.S. Cl.
  CPC ............ *G06Q 20/065* (2013.01); *G06Q 20/29* (2013.01); *G06Q 50/01* (2013.01); *A63F 13/61* (2014.09); *A63F 2300/5506* (2013.01); *A63F 2300/8082* (2013.01)

(58) Field of Classification Search
  CPC ......... G06F 3/012; G06F 3/013; G06Q 20/06; G06Q 20/065; G06Q 20/29; G06Q 20/36; G06Q 20/38; G06Q 50/01
  See application file for complete search history.

(56) References Cited

U.S. PATENT DOCUMENTS

2017/0084084 A1    3/2017  Durham et al.
2017/0116693 A1*   4/2017  Rae ...................... H04L 9/3236

OTHER PUBLICATIONS

International Search Report for Application No. PCT/AU2018/050923 dated Sep. 25, 2018, 6 pages.

\* cited by examiner

VIRTUAL REALITY INTERACTION MONITORING

CROSS-REFERENCE TO RELATED APPLICATIONS

The present application claims priority from Australian Provisional Patent Application No 2017903418 filed on 24 Aug. 2017, the content of which is incorporated herein by reference.

BACKGROUND

Technical Field

This disclosure relates to virtual reality interaction monitoring.

Description of the Related Art

Virtual reality environments, such as Second Life, have been increasing in popularity over the recent years. However, it has been difficult to monitor and quantify user interaction with the virtual environment. In particular, when objects of the virtual reality environment are fragmented between many different creators, it is difficult to monitor interaction with individual fragments across the environment. For example, a relational database that holds all the fragments would require impractically large storage space. Further, the processing of interactions in relation to that database would consume excessive computing power which could slow down the environment.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF SUMMARY

There is a need for an improved monitoring of user interaction with a virtual reality environment that requires little computing power and little storage space by the environment but at the same time supports interaction monitoring with an immense number of fragments.

The disclosed systems and methods use the gaze of a user as an indication of user interaction. In other words, the objects that are gazed at by the user are consider to be part of the user interaction. The disclosed systems and methods use transactions on a distributed ledger as a distributed mechanism to monitor user interaction. As a result, the virtual reality environment does not require an immense database of content fragments and does not need to calculate the interactions for each fragment.

A computer system for interacting with a virtual reality environment comprises:

a graphics processor to generate images representing the virtual reality environment;

a headset to display the generated images to a user interacting with the virtual reality environment;

a sensor to detect motion of the user as the user interacts with the virtual reality environment;

a gaze controller to calculate a gaze of the user based on the detected motion of the user and to identify objects in the virtual reality environment with which the user interacts based on the calculated gaze of the user;

an interaction monitor to quantify interactions of the user with the identified object in the virtual reality environment based on transactions on a distributed ledger, wherein the transactions comprise logic expressions defining an automatic execution triggered by the interaction of the user with the object in the virtual reality environment.

It is an advantage that the quantification is performed using a distributed ledger. This way, the transactions are triggered automatically, which allows for a more granular, flexible and computationally more efficient quantification than using a dedicated relational database, for example. In particular, this allows for unlimited separation of objects into components while the quantification for each component remains possible.

The transactions may comprise logic or smart contracts.

The transactions may be transactions of tokens.

The distributed ledger may comprise a blockchain.

The distributed ledger may be based on a proof of stake that is independent from a blockchain.

The object may comprise multiple components and each component may relate to a different receiver of a transaction on the distributed ledger.

Each of the multiple components may be represented by a token and creating the object may comprise combining multiple tokens representing the multiple components.

The sensor may comprise a motion sensor mechanically coupled to the headset of the user to detect motion of the head of the user.

The sensor may comprise an eye tracking sensor to detect motion of the eyes of the user.

The graphics processor may create the object based on the calculated gaze.

Quantifying interactions may comprise determining an amount of time the user interacts with the identified object.

The interaction monitor may be in the form of an application programming interface (API).

Quantifying interactions may be based on a location within the virtual environment.

The object may be a visual representation of a 3D object model.

The object may be a sound.

Interacting with the object may comprise being immersed in the object.

Also described herein is a computer-implemented method for monitoring interactions of a user with a virtual reality environment, the method comprising:

receiving an identification of objects in the virtual reality environment with which the user interacts based on a gaze of the user; and quantifying interactions of the user with the identified object in the virtual reality environment based on transactions on a distributed ledger, wherein the transactions comprise logic expressions defining an automatic execution triggered by the interaction of the user with the object in the virtual reality environment.

Optional features described of any aspect of a method, computer-readable medium, or computer system, where appropriate, similarly apply to the other aspects also described herein.

BRIEF DESCRIPTION OF THE SEVERAL VIEWS OF THE DRAWINGS

Examples will now be described with reference to the following drawings.

DETAILED DESCRIPTION

Figure 1:
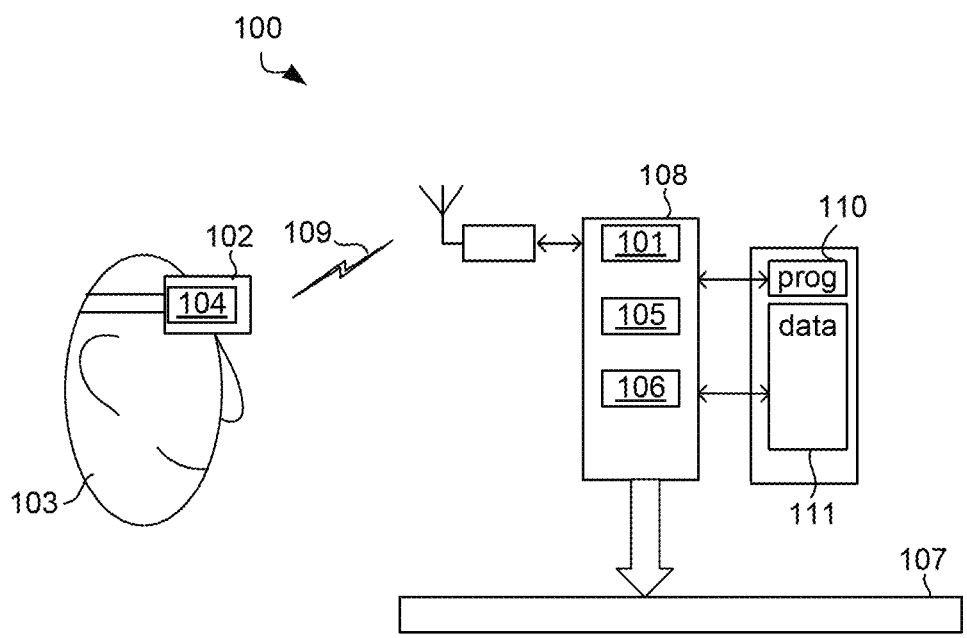
FIG. 1 illustrates a computer system 100 for interacting with a virtual reality environment.

FIG. 1 illustrates a computer system 100 for interacting with a virtual reality environment. Computer system 100 comprises a graphics processor 101 to generate images representing the virtual reality environment and a headset 102 to display the generated images to a user 103 interacting with the virtual reality environment. System 100 further comprises a sensor 104 to detect motion of user 103 as the user interacts with the virtual reality environment.

System 100 also comprises a gaze controller 105 to calculate a gaze of user 103 based on the detected motion of user 103 and to identify objects in the virtual reality environment with which user 103 interacts based on the calculated gaze of user 103. There is also an interaction monitor 106 to quantify interactions of user 103 with the identified object in the virtual reality environment based on transactions on a distributed ledger 107, wherein the transactions comprise logic expressions defining an automatic execution triggered by the interaction of user 103 with the object in the virtual reality environment.

In this example, the graphics processor, gaze controller 105 and interaction monitor 106 are implemented on a single processor 108. However, the single processor 108 may be replaced by a distributed computing environment, such as a cloud computing environment, or a peer-to-peer network where each client performs part of these functions.

In this example, there is also a wireless connection 109 between processor 108 and headset 102. Further, program memory 110 and data memory 111 are connected to processor 108. Program memory 110 stores program code which causes processor 108 to execute the methods disclosed herein. Data memory 111 may hold user data and object data of the virtual reality environment. However, quantification data that quantifies user interactions with various objects is stored on distributed ledger 107, such as the Bitcoin network or Ethereum.

Figure 2:
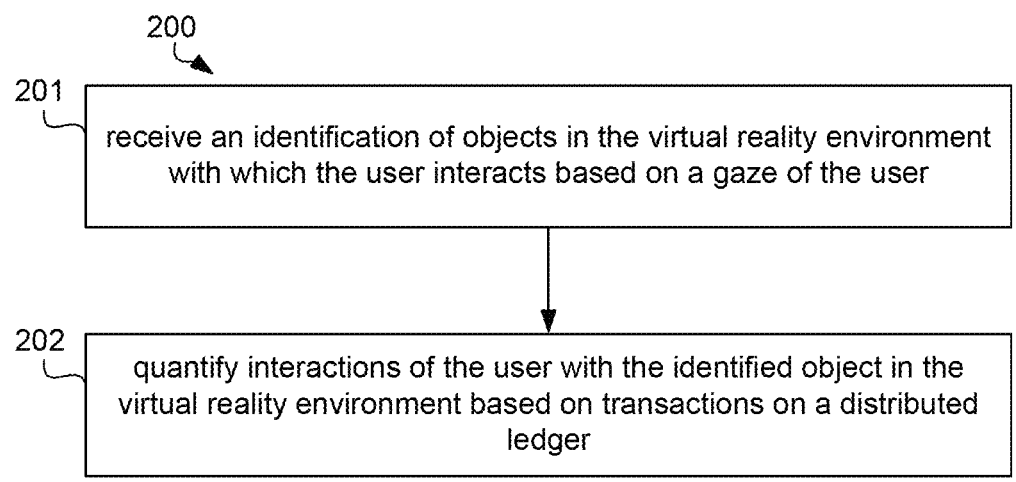
FIG. 2 illustrates a computer-implemented method 200 for monitoring interactions of a user with a virtual reality environment.

FIG. 2 illustrates a computer implemented method 200 for monitoring interactions of a user with a virtual reality environment. The method comprises the step of receiving 201 an identification of objects in the virtual reality environment with which the user interacts based on a gaze of the user. The method further comprises quantifying 202 interactions of the user with the identified object in the virtual reality environment based on transactions on a distributed ledger. Again, the transactions comprise logic expressions defining an automatic execution triggered by the interaction of the user with the object in the virtual reality environment.

Figure 3:
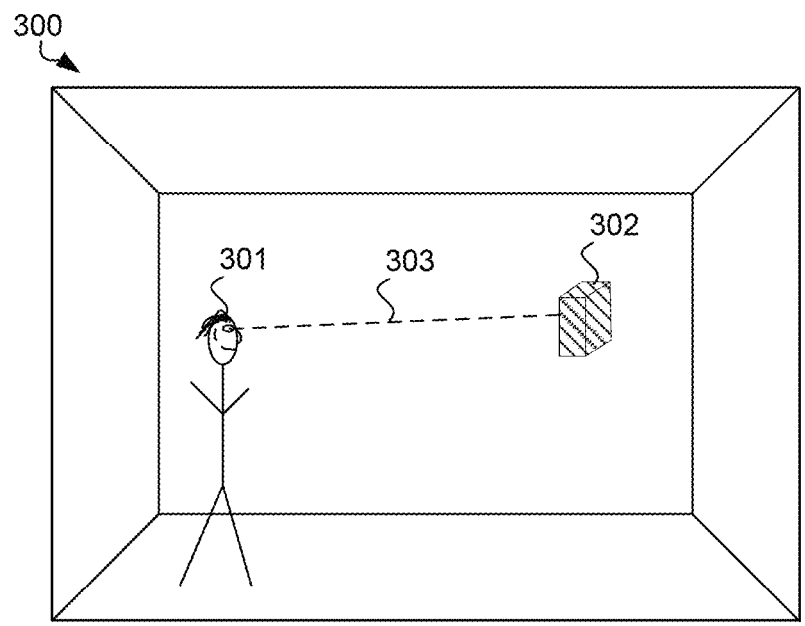
FIG. 3 illustrates a virtual reality environment.

FIG. 3 illustrates a virtual reality environment 300 comprising an avatar 301 controlled by a user 103, an object 302, and the user's gaze 303. By motion of the user 103, such as head motion, eye movement or other physical motion, the user's gaze 303 changes. In this example, the user's gaze 303 is towards the object 302. Processor 108 therefore detects interaction with object 302 and creates a transaction on distributed ledger 107. In this example, object 302 is created by a single creator, which means object 302 comprises only a single component or fragment (used interchangeably herein). This fragment is associated with a token in the distributed ledger 107. For example, the object 302 is identifiable by a unique identifier that is also the address or public key on the distributed ledger 107, and the token is associated with that identifier. As a result, processor 108 creates a transaction on distributed ledger 107 for that token to quantify that there was one user interaction with object 302. The transaction is then integrated into a block which represents a persistent record of this one user interaction.

In one example, the transactions comprise logic or smart contracts. In essence, the transactions are self-executing and self-enforcing or both and facilitate and/or enforce the negotiation or performance of a contract between the author of the object and the user. For example, the smart contracts may have a condition that is the user interaction and as an output in response to the condition being met, the smart contract transfers a token to the author of that object or fragment. In one example, the condition of the smart contract requires user 103 to provide a hash to prove that user 103 interacted with the object. The hash may be generated by the virtual reality environment and provided to the user 103 (or the author) to trigger the contract.

Figure 4:
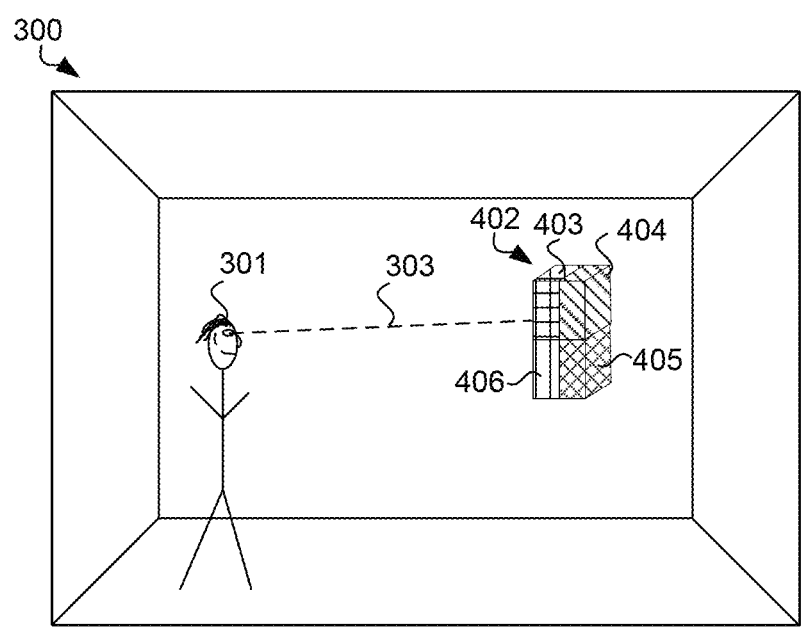
FIG. 4 illustrates the virtual reality environment from FIG. 3 but this time, there is an object comprising four different components.

FIG. 4 illustrates the same virtual reality environment 300 but this time, there is an object 402 comprising four different components 403, 404, 405 and 406. As a result, processor 108 creates transactions in relation to four different tokens. In other examples, the tokens of the component are combined, which is also referred to as 'forging'. In one example, each component is created by a different author, which means that ultimately, the recipients of the four transactions are the four authors. If, in turn, object 402 is re-used by different authors in further objects together with other building blocks, the association between the fragments 403, 404, 405, 406 and the corresponding tokens remains. This means that transactions are generated wherever object 402 is re-used and users interact with object 402 as a fragment of larger objects.

Figure 5:
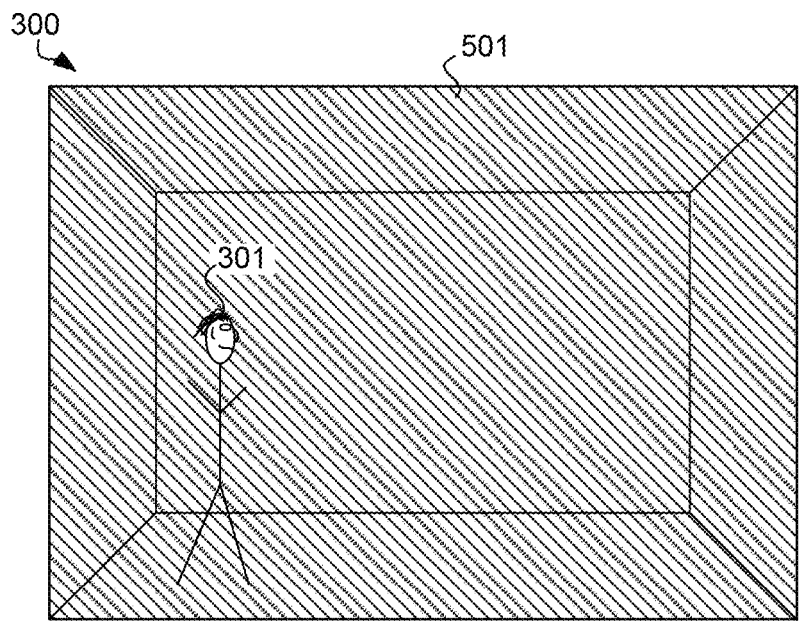
FIG. 5 illustrates another example of a virtual environment, where a user is immersed in an object.

FIG. 5 illustrates another example, where user 103 is now immersed in an object 501 as shown by avatar 301 being within the object. This is indicated by the hatching of the object now surrounding the avatar 301. This also represents user interaction with object 501. Again, object 501 may comprise a potentially large number of fragments.

The above process may also apply to audio in the sense that a particular sound comprises multiple audio fragments. In other words, the sound is a mix of existing and/or new sounds. Again, the transactions generated by processor 108 quantify user interaction with that sound. This may mean that transactions are generated as soon as the sound is played to the user. This is typically triggered by the gaze of the user resting on the object (including rooms, wormholes and other places).

In one example, distributed ledger 107 is based on a proof of stake that is independent from an established blockchain, such as Bitcoin or Ethereum. Basically, proof of stake encourages authors and others who own tokens not to be fraudulent so that their tokens retain their value.

In one example, the objects do not 'exist' as an instantiation of the object model in the virtual environment until the graphics processor creates the object based on the calculated gaze. Processor 108 may also quantify interactions by determining an amount of time the user interacts with the identified object and then determining an amount of tokens that are transferred for that interaction time. This may also be handled as a condition in a smart contract.

Method 200 may be implemented as an application programming interface (API) so that many different virtual environments can integrate method 200 and thereby quantify interactions by their users.

It is also possible to quantify interactions based on location within the virtual environment. For example, certain areas may be selected for enabling user interaction or may result in a multiplier or other modification of the measured user interaction.

Figure 6:
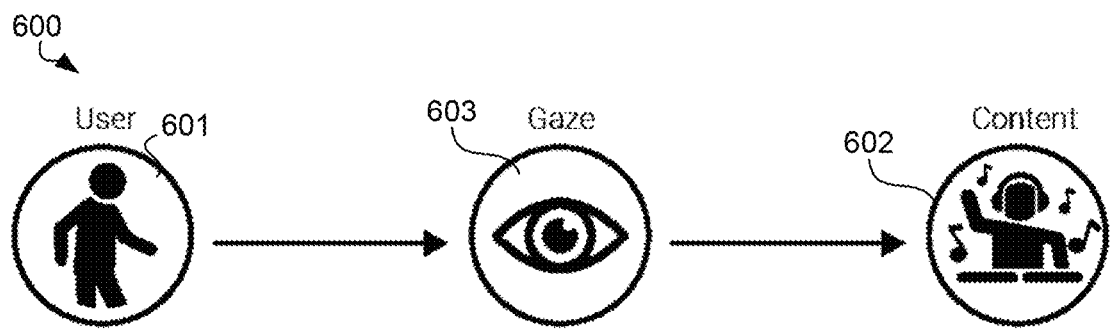
FIG. 6 illustrates a process flow from a user to a content provider.
Figure 7:
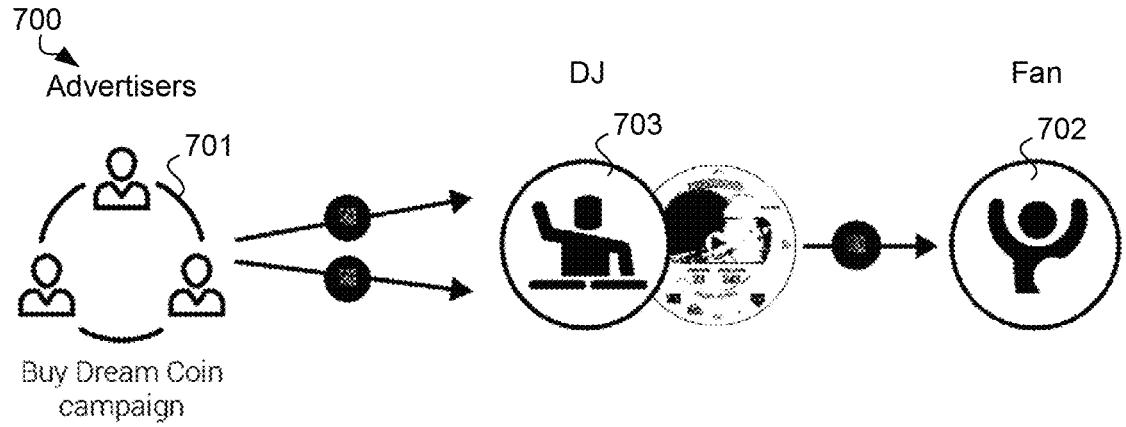
FIG. 7 illustrates a flow of coins from an advertiser to a fan.

FIG. 6 illustrates a process flow 600 from a user 601 to a content provider 602. The flow occurs via gaze 603 that is measured as described above. FIG. 7 illustrates a flow 700 of coins from an advertiser 701 to a fan. The coins initially flow from the advertiser 701 to a DJ 703 akin to a payment for a performance. The DJ 703 can then transfer the coins to fan 702 to incentivize the fan 702 to consume the DJ's 703 content.

Figure 8:
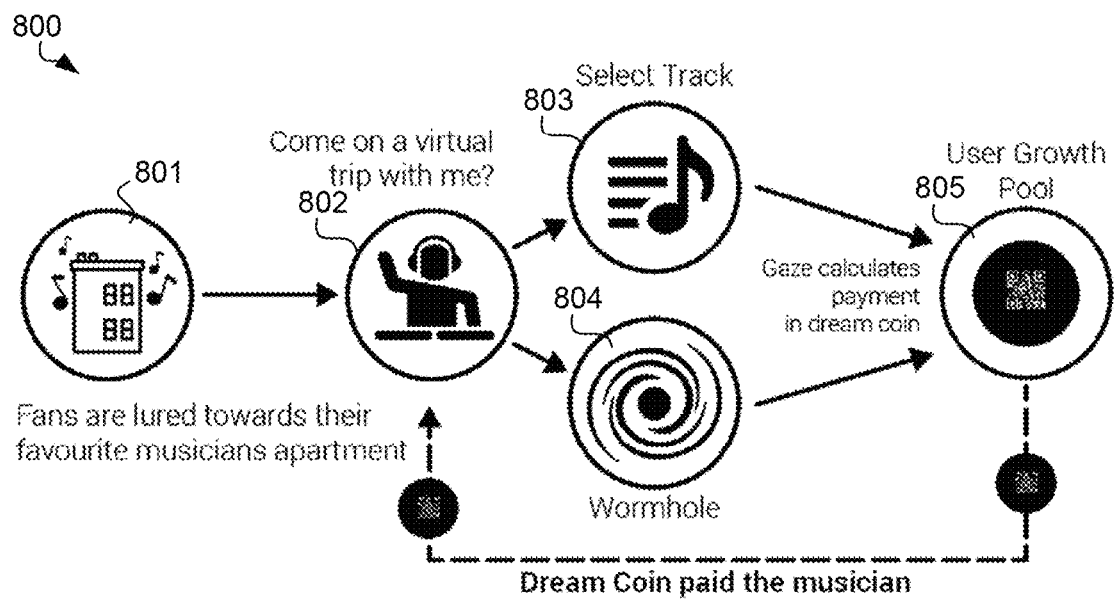
FIG. 8 illustrates a flow of coins using a user growth pool.

FIG. 8 illustrates a flow 800 of coins from a venue 801 to a DJ 802 or other content provider. The venue 801 generates sounds to lure fans towards their favorite musician's apartment, for example. The content provider 802 entices the user to either select a track 803 or interact with a wormhole 804. Consequently, gaze calculates payments in coins to a user growth pool 805. In return, user growth pool 805 transfers the coins to the content provider 802, using a user growth pool.

Figure 9:
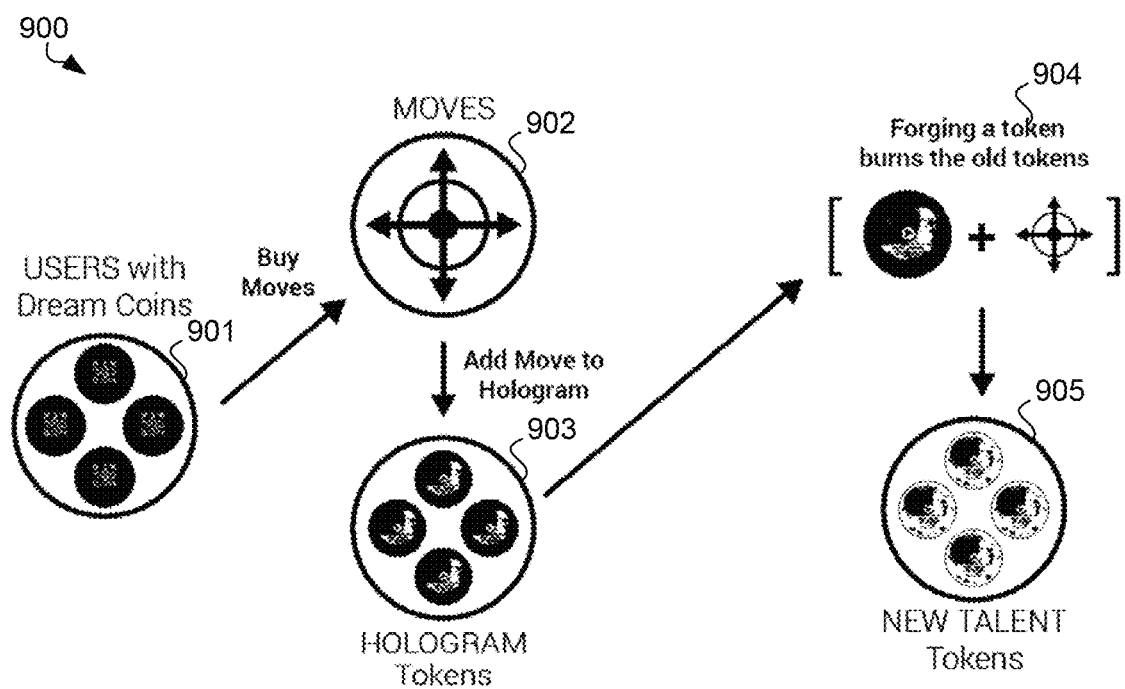
FIG. 9 illustrates a flow of coins and tokens.

FIG. 9 illustrates a flow 900 of coins and tokens. The flow 900 starts from users with coins 901 who buy moves 902. The move 902 is added to a hologram 903 and consequentially, a token is forged 904 and the old tokens are burnt. This results in new talent tokens 905.

Figure 10:
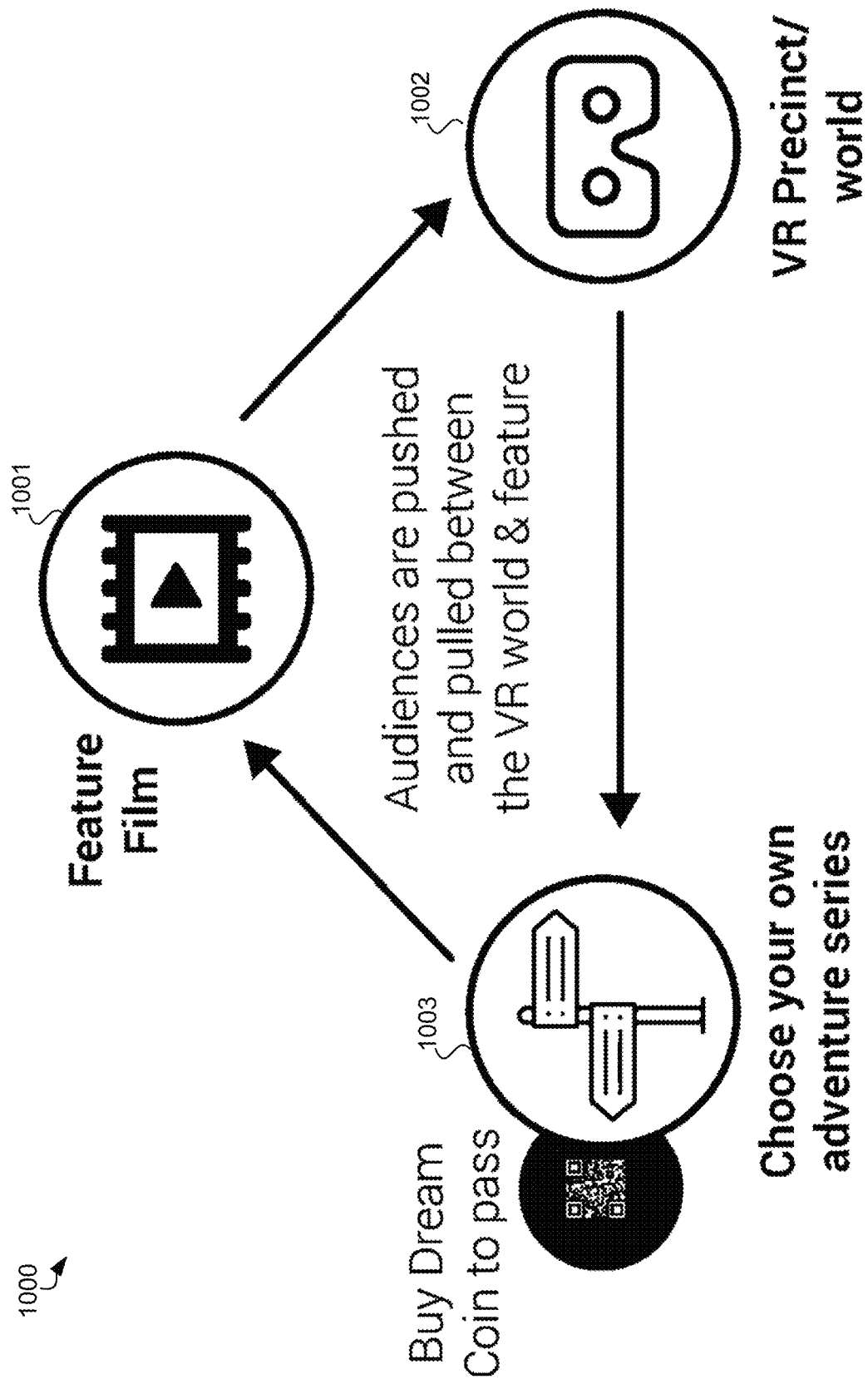
FIG. 10 illustrates a process flow involving a feature film.

FIG. 10 illustrates a process flow 1000 involving a feature film 1001, which can be played on the virtual reality display device 102 shown in FIG. 1. That is, the audience is pushed and pulled between the virtual reality environment and a feature, such as the film 1001. The user chooses 1003 their own adventure series and buys gaze coins to pass, which again causes the feature film or other feature to be played 1001 and so on.

Figure 11:
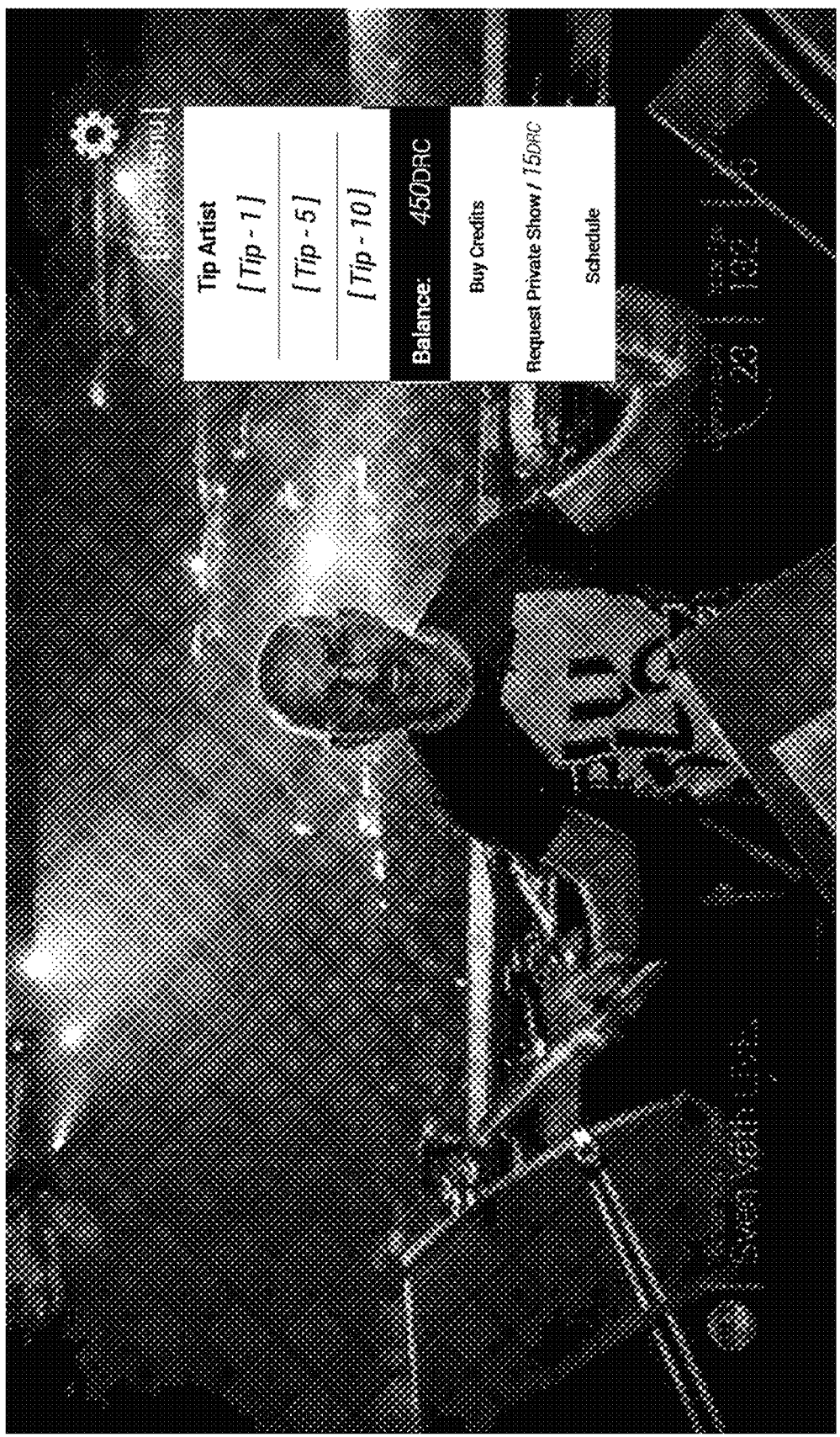
FIG. 11 illustrates a user interface for tipping an artist.

FIG. 11 illustrates a user interface for tipping an artist. This allows the user to reward the artist or other content provider with a reward in addition to the reward that is calculated by the gaze as described above. The user has a selection of tipping amounts and an indication of their current account balance.

Figures 12A, 12B, 12C:
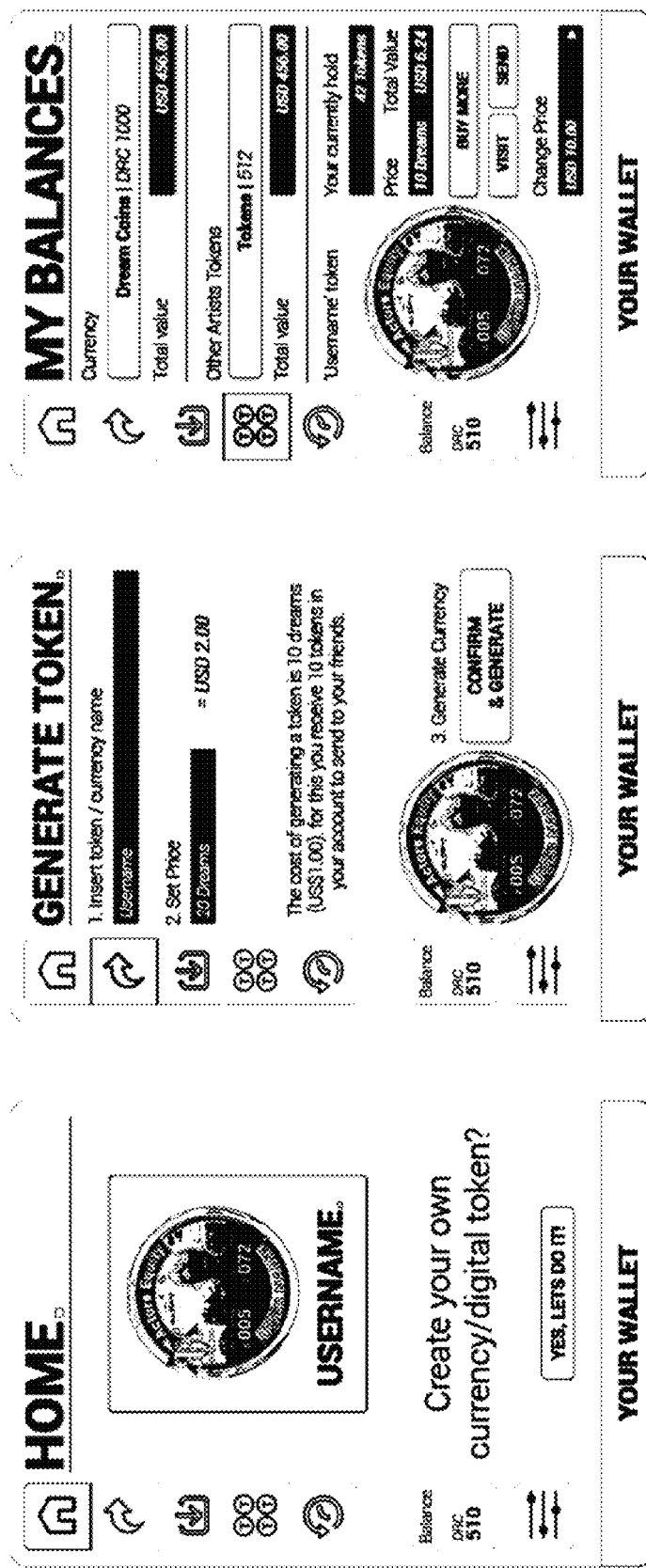
FIGS. 12a, 12b and 12c illustrate user interfaces for account management by a user.

FIGS. 12a, 12b and 12c illustrates user interfaces including a welcome screen FIG. 12a, an interface to generate a token in FIG. 12b and balances in FIG. 12c.

Currently there is no customized monetization for virtual reality and augmented reality (AR/VR) content and worlds. Gaze Coin is a blockchain token/unit of exchange between content owners, advertisers and consumers measured by 'gaze control'/eye tracking. By measuring 'gaze', Gaze Coin is able to create a model for advertising in VR/AR worlds that is at the heart of how mixed reality worlds are created and consumed.

What is Gaze Control?

'Gaze control' is a tool used by creators of virtual worlds that allows audiences to trigger content by looking in the direction of the content—usually initiated by spatial audio—only when they are ready to experience it. In this way audiences are empowered to engage with the content in their own time and according to their true interests—giving them agency and freedom while immersed.

How is 'Gaze' Measured?

Specifically the model calculates the amount of time users spend immersed inside specific content and creates a micro-payment that (i) charges advertisers for that time, (ii) pays the content owner, and (iii) reward the users for consuming the content—making content free. The model also incentivizes content owners for providing premium content.

Gaze Coin API—Integrated into Any Mixed Reality World or Content

Gaze Coin API and wallet allows 'gaze' to be measured and monetized in any virtual reality content or world. Users will be incentivized to integrate the Gaze Coin API into content that they are either creating or recommending.

Gaze Coin Blockchain

Gaze coin will operate from its own 'proof of stake' blockchain. This provides VR and AR content developers and world builders with a platform to launch their own coins unique to their brand or world. Gaze coin provides the 'gas' to create the coins and then to power transactions. The model gives content makers the freedom they need while at the same time building value in Gaze Coin.

The Dream Channel Ecosystem

Gaze Coin is distributed and promoted by 'Dream Channel'—an epic AR/VR game/ecosystem that pays players in Gaze Coin to discover, recommend, and trade in the value of AR/VR assets across the 'metaverse' (the connected VR space).

Gaze Coin Resonates From a Story that is at the Heart of Dream Channel.

A 'Choose Your Own Adventure' VR Story is at the heart of the Dream Channel game. The story explains where Gaze originates from and why it is so valuable to players.

Near future—after the lucid dreaming elixr 'Gaze' hit the streets, young people began experimenting with a new form of 'subconscious' social networking involving sharing their dreams. The place where they met was called The Dream Channel—but they needed 'gaze' to play. Soon Dream Channel began incentivizing its users to locate potential dream talent, steal their dreams, and upload them to the channel—rewarding them in Gaze. Super star lucid dreamers emerged who could become famous literally overnight.

Gaze Coin Kick-Starts the Virtual Land/Real Estate Economy

Gaze Coin understands the importance and potential of virtual real estate growth inside a decentralized Dream Channel AR/VR ecosystem. Dream Channel has already built a series of fully functional themed VR/AR cities that are connected through an overarching story narrative. Here super stars live and broadcast immersive content through the Dream Channel AR and VR channels—monetized using Gaze Coin. The cities also include an integrated social network/ranking system that promotes and rewards the most popular AR/VR talent as well as calculating rent payments to land owners. Participants in the token sale actually purchase virtual apartments, virtual streets, suburbs and entire cities as part of their package. As areas become recognized as premium content generation zones, they increase in status and popularity, increasing their value to owners. For more details on how virtual real estate functions inside Dream Channel see here.

Tracking Content & Objects into the Blockchain

Gaze Coin includes a mechanism that calculates and tracks content and 3D graphics as it they are added to and changed inside virtual worlds—storing that information in the blockchain. This is important when it comes to the creation and distribution of objects (e.g., weapons and skins inside a game, or hologram characters) and music which is often altered and remixed. Gaze then calculates how each fragment is consumed and creates a micropayment payable to content owners accordingly.

A Timely Solution

Gaze Coin not only provides a customized monetization solution for the coming VR/AR wave but also solves the problems of piracy, fraud, copyright and identity that plagues 2D content and payment systems globally. Gaze Coin is the monetization solution for the mixed reality age.

2. How does Gaze Coin Work?

A Unit of Exchange Measured by Gaze

Gaze control is a tool that can be used in the creation of Virtual Reality worlds where content is only triggered by audiences when look towards it. VR Producers often use spatial audio to lure audiences to specific locations and then 'lure' them to look in a specific direction—triggering the content. Gaze Coin uses the concept of 'gaze' to create a business model for virtual reality and augmented reality by creating a unit of exchange between content makers, advertisers and users measured initially by 'gaze' and then more specifically through eye tracking. Specifically the model rewards players and audiences for consuming content (making content free), by charging advertisers for the time users spend immersed and by incentivizing content owners for providing premium content. The economics and flow of tokens in the Gaze Coin ecosystem is explained over with reference to FIG. 6.

2. How Does Gaze Coin Work?

Example—Gaze Based Advertising

Gaze based advertising works in the following manner.

Let's use the example of a DJ who is sponsored by Red Bull, Vans and Quicksilver.

A fan of the DJ enters the VR world and is drawn to the DJ's virtual apartment by spatial audio (i.e., just like real life the music lures the fan to a location). By 'gazing' at the apartment for long enough to show interest, the fan dissolves into the apartment. Gaze Coin then makes a 'gaze' calculation based on how long the fan remains immersed within the apartment—immersed inside the music.

A background transaction takes place as follows:

The advertisers pay the DJ according to a 'gaze' calculation in 'Gaze Coin'.

The advertiser pays a second 'fan' payment to the DJ. The DJ now has a contract to 'reward' the fan for participating. The reward can be in the form of product, tickets to gigs, etc., transferred to their Gaze Coin wallet as explained with reference to FIG. 7.

User growth pool makes content free.

The Gaze Coin ICO allocates 10% of coins in total to a 'User Growth Pool'.

This aims to incentivize content owners to provide premium content experiences making this content free for users.

Immersion will transform the way that music consumed globally. As such, Gaze Coin will at first focus the pool on incentivizing users to experience music in this new way. It works as follows:

Stepping inside the DJ sector of Dream Channel spatial audio will lure audiences towards the location of their favorite DJ. 'Gazing' into the musician's virtual apartment for long enough they transition to inside their apartment—now fully immersed in the music. Inside the apartment they can select from a number of VIP tracks or DJ sets and go on a procedurally generated 'wormhole' ride immersed in the music where shapes, images and landscapes are generate randomly on the fly—and where no two journeys are ever the same, allowing for repeat experiences of the same music. The time that fans spend immersed inside the music generates a micro payment in Gaze Coin between the consumer, the musician, and rights holder. The musician/rights holder is paid from the user growth pool that is used to incentivize users to participate in the DC ecosystem as explained with reference to FIG. 8.

Tracking Content & Objects into the Blockchain

Content is often changed and added to by users as they 'craft' it for distribution. If Gaze Coin is the customized solution to monetizing VR/AR content, then it also must solve issues associated with copyright and payments to content rights holders when this occurs—an issue that currently plagues the 2D web. Gaze Coin solves this problem by including a mechanism that calculates and tracks content as it is added to and changed inside virtual worlds—storing that information in its proprietary blockchain.

Solving this issue is especially relevant when it comes to the creation and distribution of 3D objects (e.g., weapons and skins inside a game, or hologram characters) and music which is often altered and remixed. Gaze Coin then calculates how each fragment is consumed and creates a micropayment payable to content owners accordingly.

The diagram below explains how players in a 'Hologram' game add kicking or punching moves to a hologram character so they can fight inside that game. Players may start with the same character, but by adding different moves the character is now altered and unique to that player. Gaze Coin generates a new 'unique' trackable token for each character, made up of the fragments of content (the character plus the unique moves) that make up that character—a process called 'forging' that game worlds already understand. If the character earns money, the revenues can flow back via the tracking token as explained with reference to FIG. 9.

3. Building the Gaze Coin Ecosystem

Gaze Coin comes from science fiction feature film 'Dream Channel.

Near future—after the lucid dreaming elixr 'Gaze' hit the streets, young people began experimenting with a new form of 'subconscious' social networking involving sharing their dreams. The place where they met was called The Dream Channel—but they needed 'gaze' to play. Soon Dream Channel began incentivizing its users to locate potential dream talent, steal their dreams and upload them to the channel—rewarding them in Gaze. Super star lucid dreamers emerged who could become famous literally overnight.

Initially written for the big screen Dream Channel is being rolled out as a 'Choose Your Own Adventure' VR Story that forms the structural basis of the Gaze Coin ecosystem.

Gaze Coin is adopting a gamified approach to the expansion and adoption of the currency. To this end Gaze Coin is already in the process of building 'Dream Channel'—a mixed reality (VR/AR) game/ecosystem that incentivizes players in Gaze Coin to locate, recommend, explore, immerse and then trade in the value of AR/VR assets—further marketing and driving use cases for 'Gaze Coin' and uniting the metaverse.

One of the key elements of the game is its user generated 'wormhole' transport system between virtual worlds, where the wormhole is lined with immersive content and users pay a 'toll' in Gaze Coin to the content owner to travel through it.

Part of the game is a 'choose your own adventure' VR story that is central to the structure of the virtual world and provides insights into leveling up inside the game. The game tells the story of how 'gaze' was first created.

As areas become recognized as premium content generation zones, they increase in status and popularity, increasing their value to owners.

4. The Game that Monetizes the Metaverse

A Death Match Game That Unites the 'Meta-verse'

Dream Channel is a first person, open universe survival game, where players take the role of bounty hunter, searching the universe for talent and content that could be monetized on The Dream Channel—an immersive TV channel of the future—where they are rewarded in Gaze Coin. Players are armed with a 'wormhole blaster'—a weapon that enables to them to capture talent, blasting a wormhole between them and The Dream Channel—lining it with any immersive content. Wormholes provide players with transport systems to other colonies and other games worlds where a 'toll' is paid to the creator and associated talent in Gaze Coin.

The centerpiece of Dream Channel TV is a death match game featuring the most popular talent (called Dreamers) uploaded to the precinct. Tribes use Gaze Coin to bid for their favorite Dreamers, who are then pitted against each other in a deadly dream 'game show' held in the streets of the precinct. Dreamers are locked in to playing the game until they have won enough 'Gaze Coin' to pay their audience back.

Choose your own adventure 'VR' story

A pivotal part of the launch pad for Gaze coin is story. The success and failure of any virtual world comes down to the narrative and the ability for the audience to engage with that story. As such, Dream Channel plants a story seed that is critical to the growth of the world+gaze coin. The story is told through a 'choose your own adventure' VR series, feature film that teaches audiences how to use 'gaze coin' and game mechanic. In the 'choose your own adventure' series, audiences can play multiple characters and the decisions they make changes the outcome. Audiences must earn enough Gaze coin to pay gate keepers, to purchase weapons and to buy moves that they will need in battle with other players. The series is supported by a 10×10 premium short form science fiction series that promotes the virtual world and educates audiences on how to use gaze coin.

Feature Film/10×10 Series

A feature film released as a 10 episodes×10 minutes premium short form (10×10) series will accompany the VR series. Released to mobiles globally to audiences who now demand premium narrative content to mobiles the series will drive people into the VR world. At the end of each episode audiences simply need to place their phone in their headset and they are suddenly thrust into the story world as explained with reference to FIG. 10.

Log Line

Gangsters buy and sell dreams on the black market.

Tag Line

Every dream has its price.

Short Synopsis

When Lucy's dreams are stolen, she find herself the star of a deadly dream game where audiences bet Gaze coin on outcomes played nightly on The Dream Channel. Audiences venture into the VR world and discover that their dreams have been stolen too!

Platforms

Feature film, 'choose your own adventure' VR series and virtual currency 'gaze coin'.

10×10 Series/Feature Film

The story begins with Lucy and Deano stuck inside a dream channel apartment trying to come up with a dream Deano can trade on The Dream Channel in order to pay off his debts. With nothing working, Lucy proposes that she searches her dream bank for a specific dream that might create an audience. Deano resists the idea for a moment, before providing Lucy with the lucid dreaming elixr 'GAZE'

The following is the first scene in the treatment for both the feature film and VR series. The full treatment and scripts are available on request. The 10×10 series drives audiences to the VR world from their mobiles The story begins with Lucy and Deano stuck inside a dream channel apartment trying to come up with a dream Deano can trade on The Dream Channel in order to pay off his debts. With nothing working, Lucy proposes that she searches her dream bank for a specific dream that might create an audience. Deano resists the idea for a moment, before providing Lucy with the lucid dreaming elixr 'Dice'—a lucid dreaming enabler that gives him entrance to The Dream Channel. Lucy enters the Dream Channel and to Deano's surprise (watching Lucy's dream through a TV monitor) Lucy appears to be quite well versed in the how The Dream Channel works.

Flipping through a myriad of dreams Deano's eyes pop with surprise as

Lucy begins delving deeply into a dream that could potentially be a ratings winner. When Lucy wakes up Deano opts not to reveal the contents of the dream. Instead he begins to strategize how to gain possession of it for himself

VR Series

Your Dream Channel journey begins with you standing on a street corner inside Dream Channel—a futuristic entertainment precinct, where dreamers are paid to upload their dreams. You quickly realize you not a passive observer in this world—you are a dreamer who goes by the handle K*Grind—(a character who could be of any gender) and your dreams have been stolen too! Who are all these people in my dreams? Why don't I remember? Why is it that they have all been waiting for me to come back? Am I a star? What relationships have I had? Lured towards a sector of the city that resembles Amsterdam suddenly rival lucid dreamers rush towards you—mistaking you for someone else. You realize you have strayed into a sector of Dream Channel where a nightly 'Running Man' style game show is in progress (This is Lucy's dream!). A group of dream 'assassins' are playing a deadly game of cat and mouse. Who are these people? What are the stakes in this game? Who am I in this world?

Navigation System

Audiences engage a global navigation system allowing them to teleport between sectors—each one a different chapter of the story Sounds draw you to an artist's virtual apartment. These can also act as portals to other connected virtual worlds.

Artists present their content in a menu system. Each item is a portal to a new world. When the immersive experience ends audiences find themselves back in Dream Channel.

Virtual Apartments

Characters (and talent) live inside virtual apartments. These immersive store fronts use a 'freemium' model to deliver premium content to audiences (and fans)

Wormhole Content

Artists line wormholes with their immersive content—users use them as tollways to other connected worlds.

8. Gaze Coin Wallet

All Gaze Coin owners receive a Dream Channel wallet. The wallet not only stores cryptocurrency but functions as a seamless application that allows the transfer of assets from the virtual world to the real world. This transfer occurs through the issue of blockchain tokens generated by . . . .

All Gaze Coin owners receive a Dream Channel wallet. The wallet now only stores cryptocurrency but functions as a seamless application that allows the transfer of assets from the virtual world to the real world. This transfer occurs through the issue of blockchain tokens generated by 'gaze', e.g., a user's actions in the virtual world inside a content experience (i.e., they may have spent a great deal of time inside a specific experience) may generate a VIP token sent to their wallet. The token may provide the user with access to real world events, locations, or content. This can work for transferring control and even ownership of real world assets including cars, apartments and ticketed gigs.

Coins are stored in a visual wallet that allows players to better understand/view and trade their coins.

This wallet is part of the social network layer that supports the coins.

VR Radio

Dream Channel has been recording and live streaming electronic music artists in VR as part of an initiative called VR RADIO. The concept involves capturing artists as a hologram creating a point cloud stream of the artist. This 'stream' is broadcast into a virtual apartment inside Dream Channel. Audiences can access the stream live through their phones in 2D. They can then opt to enter the DJ's virtual apartment in AR 'live' looking through their phones screens, or in VR using their goggles. Each DJ has their own Dream 'talent' token. These are collectible/can be swapped, and provide fans with access to VIP content.

To date we have filmed the following DJ's/the DJ's have registered for virtual apartments. We have included their Facebook and Sound Cloud followers It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer system for interacting with a virtual reality environment, the computer system comprising:
   a graphics processor to generate images representing the virtual reality environment;
   a headset to display the generated images to a user interacting with the virtual reality environment;
   a sensor to detect motion of the user as the user interacts with the virtual reality environment;
   a gaze controller to calculate a gaze of the user based on the detected motion of the user and to identify objects in the virtual reality environment with which the user interacts based on the calculated gaze of the user; and
   an interaction monitor program comprised of executable program code configured to quantify interactions of the user with an identified object in the virtual reality environment based on transactions on a distributed ledger, wherein the transactions comprise logic expressions defining an automatic execution triggered by the interaction of the user with the object in the virtual reality environment.

2. The computer system of claim 1, wherein the transactions comprises logic or smart contracts.

3. The computer system of claim 1, wherein the transactions are transactions of tokens.

4. The computer system of claim 1, wherein the distributed ledger comprises a blockchain.

5. The computer system of claim 1, wherein the distributed ledger is based on a proof of stake that is independent from a blockchain.

6. The computer system of claim 1, wherein the object comprises multiple components and each component relates to a different receiver of a transaction on the distributed ledger.

7. The computer system of claim 6, wherein each of the multiple components is represented by a token and creating the object comprises combining multiple tokens representing the multiple components.

8. The computer system of claim 1, wherein the sensor comprises a motion sensor mechanically coupled to the headset of the user to detect motion of the head of the user.

9. The computer system of claim 1, wherein the sensor comprises an eye tracking sensor to detect motion of the eyes of the user.

10. The computer system of claim 1, wherein the graphics processor creates the object based on the calculated gaze.

11. The computer system of claim 1, wherein quantifying interactions comprises determining an amount of time the user interacts with the identified object.

12. The computer system of claim 1, wherein the interaction monitor is in the form of an application programming interface (API).

13. The computer system of claim 1, wherein quantifying interactions is based on location within the virtual environment.

14. The computer system of claim 1, wherein the object is a visual representation of a 3D object model.

15. The computer system of claim 1, wherein the object is a sound.

16. The computer system claim 1, wherein interacting with the object comprises being immersed in the object.

17. A computer implemented method for monitoring interactions of a user with a virtual reality environment, the method comprising:
   receiving an identification of objects in the virtual reality environment with which the user interacts based on a gaze of the user; and
   quantifying interactions of the user with an identified object in the virtual reality environment based on transactions on a distributed ledger, wherein the transactions comprise logic expressions defining an automatic execution triggered by the interaction of the user with the object in the virtual reality environment.

* * * * *